(12) United States Patent
Mena et al.

(10) Patent No.: US 10,721,174 B2
(45) Date of Patent: Jul. 21, 2020

(54) NETWORK-BASED COORDINATION OF LOSS/DELAY MODE FOR CONGESTION CONTROL OF LATENCY-SENSITIVE FLOWS

(71) Applicant: Cisco Technology, Inc., San Jose, CA (US)

(72) Inventors: Sergio Mena, Saubraz (CH); Xiaoqing Zhu, Austin, TX (US); Jiantao Fu, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 17 days.

(21) Appl. No.: 16/155,304

(22) Filed: Oct. 9, 2018

(65) Prior Publication Data

US 2020/0112517 A1 Apr. 9, 2020

(51) Int. Cl.
H04L 12/891 (2013.01)
H04L 12/869 (2013.01)
H04L 12/26 (2006.01)

(52) U.S. Cl.
CPC .......... *H04L 47/41* (2013.01); *H04L 43/0829* (2013.01); *H04L 47/58* (2013.01)

(58) Field of Classification Search
CPC ..... H04L 47/12; H04L 47/283; H04L 47/193; H04L 43/0852; H04L 47/11;
(Continued)

(56) References Cited

U.S. PATENT DOCUMENTS

| 5,367,523 A | 11/1994 | Chang et al. |
| 6,965,943 B1 | 11/2005 | Golestani |

(Continued)

FOREIGN PATENT DOCUMENTS

| CN | 102882803 A | 1/2013 |
| WO | 2017215392 A1 | 12/2017 |

OTHER PUBLICATIONS

S. Floyd et al., "The NewReno Modification to TCP's Fast Recovery Algorithm," Network Working Group, Request for Comments: 2582, Apr. 1999, 12 pgs. S. Floyd et al., "TCP Friendly Rate Control (TFRC) : Protocol Specification," Network Working Group, Request for Comments: 5348, Sep. 2008, 58 pgs.
J. Gettys et al., "Bufferbloat: Dark Buffers in the Internet," ACM Queue, vol. 9, Issue 11, Nov. 2011, pp. 1-15.
S. Shalunov et al., "Low Extra Delay Background Transport (LEDBAT)," RFC: 6817, Dec. 2012, 25 pgs.
(Continued)

*Primary Examiner* — Paul H Masur
*Assistant Examiner* — Michael K Phillips
(74) *Attorney, Agent, or Firm* — Edell, Shapiro & Finnan, LLC

(57) ABSTRACT

A controller of a network, including routers to forward flows of packets originated at senders to receivers along distinct network paths each including multiple links, such that the flows merge at a common link that imposes a traffic bottleneck on the flows, receives from one or more of the routers router reports that each indicate an aggregate packet loss that represents an aggregate of packet losses experienced by each of the flows at the common link. The controller sends to the senders aggregate loss reports each including the aggregate packet loss so that the senders have common packet loss information for the common link on which to base decisions as to whether to switch from delay-based to loss-based congestion control modes when implementing dual-mode congestion control of the flows. In lieu of the controller, another example employs in-band router messages populated with packet losses by the routers the messages traverse.

20 Claims, 12 Drawing Sheets

(58) Field of Classification Search
CPC ..... H04L 43/0835; H04L 47/26; H04L 47/41; H04L 47/58; H04L 43/0829
See application file for complete search history.

(56) References Cited

U.S. PATENT DOCUMENTS

| | | | |
|---|---|---|---|
| 8,687,498 B2 | 4/2014 | Imai | |
| 9,584,420 B2 | 2/2017 | Mena de la Cruz et al. | |
| 2002/0181494 A1 | 12/2002 | Rhee | |
| 2005/0018617 A1 | 1/2005 | Jin et al. | |
| 2005/0152397 A1 | 7/2005 | Bai et al. | |
| 2006/0050640 A1 | 3/2006 | Jin et al. | |
| 2006/0069799 A1* | 3/2006 | Hundscheidt | H04W 28/10 709/232 |
| 2009/0019505 A1 | 1/2009 | Gopalakrishnan et al. | |
| 2009/0059937 A1* | 3/2009 | Kanada | H04L 41/5003 370/401 |
| 2009/0104894 A1* | 4/2009 | Katis | H04L 51/04 455/413 |
| 2010/0098176 A1* | 4/2010 | Liu | H04L 12/1868 375/259 |
| 2010/0188989 A1* | 7/2010 | Wing | H04L 43/065 370/252 |
| 2013/0083656 A1 | 4/2013 | Wigell | |
| 2015/0295827 A1 | 10/2015 | Zhu et al. | |
| 2016/0149788 A1* | 5/2016 | Zhang | H04L 43/10 709/224 |
| 2016/0330123 A1* | 11/2016 | Mena de la Cruz | H04L 47/12 |
| 2017/0289846 A1* | 10/2017 | Wetterwald | H04L 69/323 |
| 2017/0331744 A1 | 11/2017 | Mehrotra et al. | |
| 2018/0145914 A1 | 5/2018 | Zhao et al. | |
| 2018/0324237 A1* | 11/2018 | Johansson | H04L 65/605 |

OTHER PUBLICATIONS

X. Zhu et al., "NADA: A Unified Congestion Control Scheme for Real-Time Media," draft-zhu-rmcat-nada-00, Network Working Group, Internet Draft, Cisco Systems, Oct. 14, 2012, 10 pgs.

X. Zhu et al., "NADA: A Unified Congestion Control Scheme for Low-Latency Interactive Video," Cisco Systems, Inc., Jul. 22, 2013 (CPOL), 8 pgs.

H. Lundin et al., "A Google Congestion Control Algorithm for Real-Time Communication on the World Wide Web," draft-alvestrand-rtcweb-congestion-01, Network Working Group, Internet Draft, Oct. 29, 2011, 19 pgs.

L. Budzisz et al., "On the Fair Coexistence of Loss- and Delay-Based TCP," IEEE/ACM Transactions on Networking, vol. 19, No. 6, Dec. 2011, pp. 1811-1824.

FP Kelly et al., "Rate control for communication networks: shadow prices, proportional fairness and stability," Journal of the Operational Research Society, 1998, vol. 49, pp. 237-252.

S. Floyd et al., "Equation-Based Congestion Control for Unicast Applications," International Computer Science Institute (ICSI), ACM SIGCOMM, vol. 30, No. 4, Feb. 9, 2000, pp. 1-18.

K. Ramakrishnan et al., "The Addition of Explicit Congestion Notification (ECN) to IP," Network Working Group, Request for Comments: 3168, Sep. 2001, 63 pgs.

I. Johansson, et al., "Self-Clocked Rate Adaption for Multimedia", Internet Engineering Task Force (IETF), ISSN: 2070-1721, Dec. 2017, RFC 8298, 36 pages.

X. Zhu, et al., "NADA: A Unified Congestion Control Scheme for Real-Time Media", draft-ietf-rmcat-nada-06, Network Working Group, Internet-Draft, Dec. 3, 2017, 26 pages.

S. Holmer, et al., "A Google Congestion Control Algorithm for Real-Time Communication", draft-ietf-rmcat-gcc-02, Network Working Group, Internet-Draft, Jul. 8, 2016, 19 pages.

\* cited by examiner

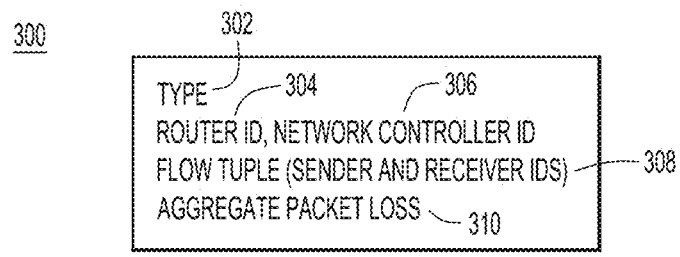
FIG.3
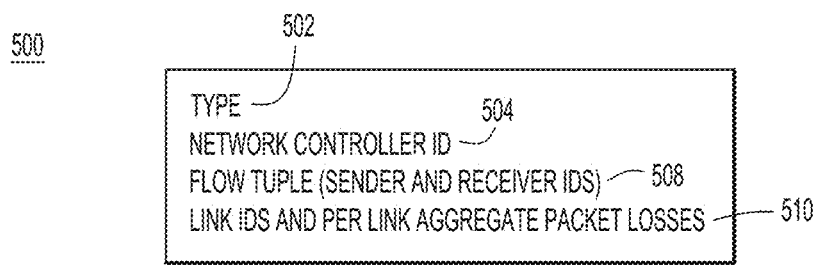
FIG.4
FIG.5

NETWORK-BASED COORDINATION OF LOSS/DELAY MODE FOR CONGESTION CONTROL OF LATENCY-SENSITIVE FLOWS

TECHNICAL FIELD

The present disclosure relates to techniques to assist in congestion control of traffic flows in a network.

BACKGROUND

Conventional dual-mode congestion control algorithms governing dual-flows in a network determine whether to switch to a loss-based congestion control mode upon detecting packet losses experienced by the dual-flows, and assume that the packet losses are induced by the presence of other loss-based flows in the network; however, when several dual-flows share a common network bottleneck with one or more pure loss-based flows, per-flow packet losses experienced by individual dual-flows may not be consistent across the flows. The inconsistent packet losses across the dual-flows can lead to degradation of fairness amongst them at the network bottleneck, which is an undesirable side-effect.

BRIEF DESCRIPTION OF THE DRAWINGS

FIG. 3 is an illustration of a router report sent by a router to convey packet losses experienced by traffic flows traversing the router in the dual-flow network bottleneck arrangement, according to an example embodiment.

FIG. 4 is an illustration of a loss statistics database generated by the network controller from router reports, according to an example embodiment.

FIG. 5 is an illustration of an aggregate loss report constructed based on information in the loss statistics database, according to an example embodiment.

DESCRIPTION OF EXAMPLE EMBODIMENTS

Overview

In one embodiment, a controller of a network performs a method. The network includes routers to forward flows of packets originated at respective sender endpoints to respective receiver endpoints along distinct respective network paths each including multiple links, such that the flows merge at a common link served by one or more of the routers and that imposes a traffic bottleneck on the flows traversing the common link. In the method, the controller receives router reports from the one or more of the routers. Each router report indicates an aggregate packet loss that represents an aggregate of respective packet losses experienced by each of the flows at the common link as measured by the router that originated the router report. The controller sends to the sender endpoints respective aggregate loss reports each including the aggregate packet loss so that the sender endpoints have common packet loss information for the common link on which to base decisions as to whether to switch from delay-based to loss-based congestion control modes when implementing dual-mode congestion control of the flows.

In another embodiment, a router in a network of routers and receiver endpoints collectively perform a method. The network of routers forward flows of packets, and forward a respective in-band message associated with each flow, originated at respective sender endpoints to respective ones of the receiver endpoints along distinct respective network paths each including multiple links, such that the flows merge at a common link served by the router. In the method, the router determines packet losses experienced by each flow traversing the common link, aggregates the determined packet losses for each flow into an aggregate packet loss for the flows at the common link, and populates each in-band message with the aggregate packet loss when the in-band message traverses the common link. At each receiver endpoint, upon receiving the respective in-band message, the receiver endpoint forwards, in a respective aggregate loss report, the aggregate packet loss from the in-band message to the sender endpoint that originated the flow associated with the in-band message, so that the sender endpoints have common packet loss information for the common link on which to base decisions as to whether to switch from delay-based to loss-based congestion control modes when implementing dual-mode congestion control of the flows.

EXAMPLE EMBODIMENTS

Figure 1:
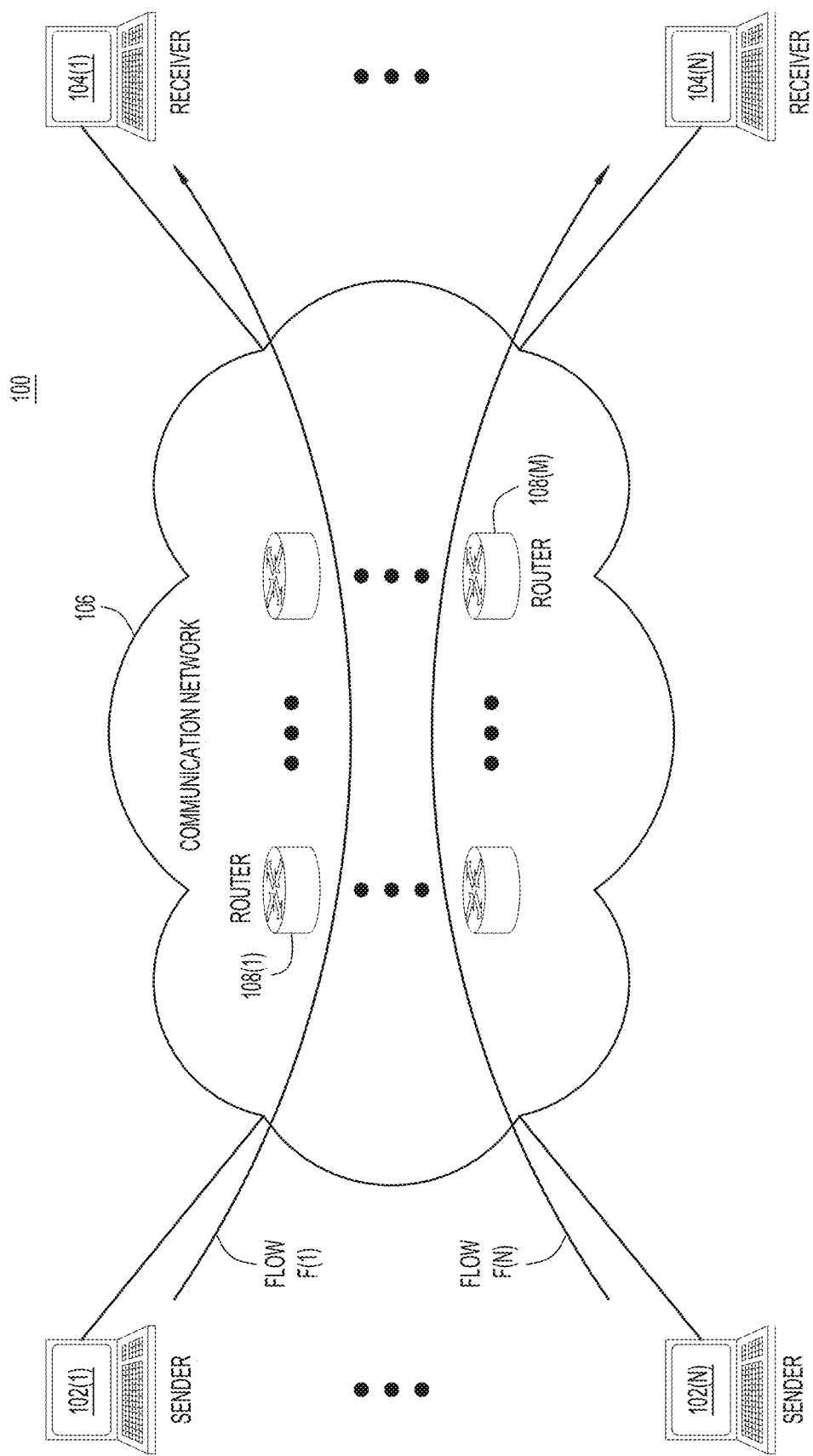
FIG. 1 is an illustration of a generalized network environment in which embodiments for sharing packet loss information for traffic flows with senders of dual-flow traffic may be implemented, according to an example embodiment.

With reference to FIG. 1, there is an illustration of a generalized network environment 100 in which embodiments directed to sharing of traffic flow packet loss information with dual-mode congestion control methods may be implemented. Network environment 100 includes sender endpoint devices 102(1)-102(N) (referred to as "sender endpoints" and more simply as "senders"), receiver endpoint devices 104(1)-104(N) (referred to as "receiver endpoints" and more simply as "receivers"), and a communication network 106 connected to the senders and the receivers, and over which the senders communicate with the receivers. Senders 102(1)-102(N) (referred to collectively as senders 102 and individually as a sender 102) and receivers 104(1)-104(N) (referred to collectively as receivers 104 and individually as a receiver 104) may include wired and wireless communication devices, such as personal computers, tablets, Smartphones, video conference equipment, and the like. Communication network 106 includes one or more wide area networks (WANs), such as the Internet, and one or more local area networks (LANs). Communication network 106 includes network devices 108(1)-108(M) to forward packets across the network. Network devices 108(1)-108(M) may include routers and switches, more generally referred to as "routers" for convenience.

Senders 102(1)-102(N) originate respective traffic flows (referred to simply as "flows") F(1)-F(N) of data packets destined for respective ones of receivers 104(1)-104(N), and send the flows to the receivers over network 106. The data packets may carry multi-media data content, such as voice, audio, video, text, and so on, and are thus also referred to as "media packets." Routers 108 forward flows F(1)-F(N) (collectively referred to as flows F) along distinct respective network paths from respective receivers 102 to respective senders 104, in accordance with any known or hereafter developed network protocol, such as the Internet Protocol (IP). Typically, the data packets each include a packet header that contains a flow tuple that uniquely identifies the flow to which the data packet belongs. The flow tuple includes an identifier of the corresponding sender 102(i) (e.g., a source Internet Protocol (IP) address and User Datagram Protocol (UDP) port of the sender) and an identifier of the corresponding receiver 104(i) (e.g., a destination IP address and UDP port of the receiver) for the flow. Each network path along which a given flow is forwarded includes a respective series, i.e., successive, network hops or communication links (more generally referred to as "links") established by and between various routers along the network path. Thus, more generally, routers 108 forward flows F(1)-F(N) of data packets originated at respective ones of senders 102(1)-102(N) over respective network paths, each including multiple successive links, to respective ones of receivers 104(1)-104(N).

In network environment 100, different types of congestion control algorithms may govern flows F to ensure the flows have data/packet rates commensurate with available transmission bandwidths along the network paths traversed by the flows. The different types of congestion control algorithms include pure delay-based congestion control (the delay-based mode) algorithms, pure loss-based congestion control (the loss-based mode) algorithms, or dual-mode congestion control algorithms. The flows governed by delay-based, loss-based, and dual-mode congestion control algorithms may be referred to as delay-based flows, loss-based flows, and dual-flows, respectively. Pure delay-based flows, pure loss-based flows, and dual-flows operate in only the delay-based mode, only the loss-based mode, and both delay-based and loss-based modes of congestion control, respectively. Dual-mode congestion control may be used for latency (i.e., delay)-sensitive applications (e.g., video conferencing), and switches between delay-based and loss-based modes of congestion control. For example, the delay-based mode throttles a sending rate (e.g., data packets per second) for a given flow as soon as an increase in data packet transmission delay is detected. On the other hand, the loss-based mode generally will not start throttling the sending rate until data packet losses in the flow are detected. The delay-based mode tends to back off the sending rate earlier than (i.e., before) the loss-based mode, and therefore tends to be less aggressive than the loss-based mode. Examples of algorithms for dual-mode congestion control include candidate proposals at the Internet Engineering Task Force (IETF) (Real-Time Media Congestion Avoidance Technique) RMCAT Working Group, including Self-Clocked Rate Adaptation for Multimedia (SCREAM) (https://tools.ietf.org/html/rfc8298) by Ericsson, Network-Assisted Dynamic Adaptation (NADA) (https://tools.ietf.org/html/draft-ietf-rmcat-nada-09) by Cisco, and Google Congestion Control (https://tools.ietf.org/html/draft-ietf-rmcat-gcc-02).

A dual-mode congestion control algorithm typically employs the less aggressive, delay-based mode by default, and only switches to the more aggressive, loss-based mode when the algorithm discerns that the flow (i.e., the dual-flow) governed/controlled by the algorithm shares a common bottleneck link with one or more additional pure loss-based flows, for example. Examples of loss-based flows include Transmission Control Protocol (TCP) NewReno and TCP Friendly Rate Control (TFRC). In the bottleneck scenario, the dual-flow switches from the delay-based mode to the loss-based mode in the presence of the pure loss-based flows, so as to sustain a fair share of network path bandwidth across the flows in the bottleneck, and to avoid "starvation," which is a situation in which the flow is starved for bandwidth given to other flows. In another scenario in which all of the flows sharing the bottleneck link are either dual-flows or pure delay-based flows, ideally, the dual-flows should not switch to loss-based mode, thereby avoiding unnecessary packet losses and high queuing delay.

Conventional dual-mode congestion control algorithms governing dual-flows determine whether to switch to loss-based mode upon detecting packet losses on the dual-flows, and assume that the packet losses are induced by the presence of other loss-based flows; however, when several dual-flows share a common bottleneck with one or more pure loss-based flows, per-flow/respective packet losses experienced by individual dual-flows may not be consistent across the flows. The inconsistent packet losses across the dual-flows can lead to degradation of fairness amongst them at the bottleneck, which is an undesirable side-effect to be avoided.

Embodiments presented herein tackle the root cause of such fairness degradation by ensuring that all dual-flows sharing a common bottleneck link obtain consistent packet loss information, i.e., packet loss information that is the same, and account for all of the packet losses, across all of the flows that share the bottleneck link, so that the individual dual-mode congestion control algorithms governing each of the dual-flows can coordinate delay-mode/loss-mode switching decisions with respect to the other dual-flows at the bottleneck link. Referring again to FIG. 1, in the embodiments, generally, routers 108 measure local packet losses (i.e., packet losses occurring at the successive communication links supported by the routers along the network paths) and share those packet losses across all dual-flows traversing the routers. In an example, the packet losses are shared with all senders 102 of the dual-flows sharing the bottleneck link. This enables each sender 102(i) to choose its respective congestion control mode for its dual-flow based on common packet losses experienced at the shared bottleneck link, and shared with the sender, instead of having to infer such decisions individually.

First and second embodiments are descried below in connection with FIGS. 2-6 and 7-10, respectively. In both embodiments, packet losses are measured and monitored at each router 108($i$), and shared to senders 102, either via a central controller in the first embodiment of FIG. 2, or via in-path messages in the second embodiment of FIG. 7. Senders 102 then determine whether to switch between delay-based and loss-based modes of congestion control based on the shared packet loss information.

Figure 2:
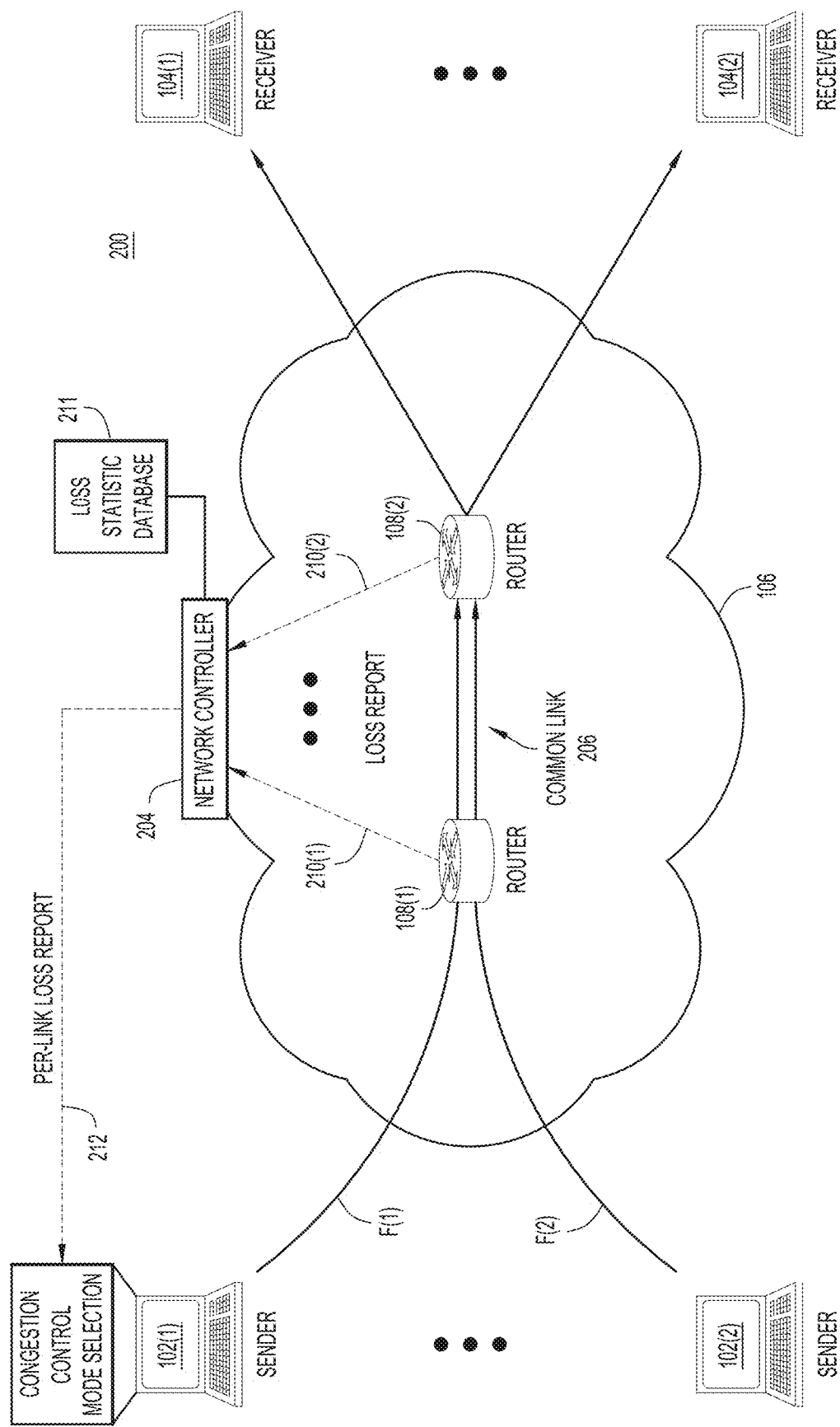
FIG. 2 is an illustration of a dual-flow network bottleneck arrangement in which a centralized network controller collects, aggregates, and shares consistent packet losses with the senders of the dual-flow traffic, according to an embodiment.

With reference to FIG. 2, there is an illustration of an example dual-flow network bottleneck arrangement 200 useful for describing the first embodiment, in which a centralized network controller 204 shares consistent packet losses to senders 102 for dual-mode congestion control imposed by the senders on their respective flows. In arrangement 200, routers 108 may form part of a software defined network (SDN). The SDN includes centralized network controller 204 to configure, monitor, and control the SDN, including routers 108, via control plane messages forwarded over a control plane of the SDN. On the other hand, routers 108 forward flows F in the data plane. Specifically, senders 102(1), 102(2) originate dual-flows F(1), (F2) destined for receivers 104(1), 104(2), respectively. Senders 102(1), 102(2) each employ dual-mode congestion control (indicated generally at 205) on their respective dual-flows flows F(1), F(2). Routers 108 forward dual-flows F(1), F(2) along distinct respective network paths that each include multiple links, only one of which is shown in FIG. 2. As shown in FIG. 2, the distinct respective network paths, and thus dual-flows F(1), F(2), merge at/share a common link 206, served or supported by routers 108(1), 108(2). On either side of common link 206, the distinct respective network paths converge or diverge with respect to each other, and thus do not share common links/routers. Common link 206 imposes a traffic bottleneck on dual-flows F(1), F(2) because a combined transmission bandwidth at which flows F(1), F(2) may operate exceeds a maximum transmission bandwidth available at the common link. A single common link is shown in FIG. 2 by way of example and for ease of description, only; however, it is understood that there may be multiple such common links (i.e., traffic bottlenecks) in any given network, and that the techniques described herein may be applied to each of the multiple common links.

In accordance with the first embodiment, generally, each router 108($i$) at each link of each network path performs the following operations. The router determines for each of the flows traversing the router packet losses experienced by each flow. When the data packets comprise IP packets, the router may uniquely identify each flow that traverses the router based on flow tuples carried in the IP headers of IP packets of the flow, for example. To determine packet losses for a given flow, the router may detect overflows of ingress and egress packet buffers of the router, and record for the flow (e.g., for the flow tuple) a number of packets dropped as a result of the overflows among a total number of packets received for forwarding. When multiple flows traverse the router concurrently, the router determines packet losses individually for each of the multiple flows, and aggregates (e.g., adds) together the individual packet losses for the individual flows into an aggregate packet loss experienced by all of the flows traversed by the router. The router records into a router report (i) the determined packet losses as the aggregate packet loss (e.g., the number of dropped packets for all of the flows and the total number of packets received for forwarding for all of the flows, or other statistics that convey the number of dropped packets and the total number of packets to be forwarded), and (ii) an identifier for each flow to which the determined information pertains (e.g., the flow tuple), and then sends the router report to network controller 204. The router report also includes information to identify the router that compiled the report (e.g., an IP address, and/or TCP/UDP port, and/or media access control (MAC) address of the router), which, together with the flow tuple, may uniquely indicate the link of the network path for the flow.

Each router 108($i$) repeats the aforementioned process as time progresses, and may periodically send its router reports to network controller 204. Specifically, in arrangement 200, routers 108(1), 108(2) each determine an aggregate packet loss experienced by both flows F(1), F(2) at common link 206, and send to network controller 204 router reports 210(1), 210(2), respectively, conveying the determined aggregate packet loss for both flows, along with identifiers of the flows to which the information pertains, and the identifier of the router originating the router report (also referred to as a "packet loss report").

Network controller 204 receives the aforementioned router reports from routers 108, including router reports 210(1), 210(2) sent from routers 108(1), 108(2) at common link 206. Network controller 204 may receive the reports periodically, as routers 108 send them. As a result of the information contained in the router reports, network controller 206 possesses the respective aggregate packet loss for all of the flows at each link of each network path.

Armed with the router reports, network controller 204 also constructs and maintains (e.g., updates) a loss statistics database 211 that maps each flow F(i) to (i) the sender 102($i$) that originated the flow (e.g., based on the flow tuples in the router reports), (ii) a list of links traversed by the flow along its network path (e.g., based on the flow tuples and router identifiers included in the router reports), and, for each link, the aggregate packet loss for all of the flows that traverse the link (derived as described above). Based on the aforementioned information in loss statistics database 211, network controller 204 constructs aggregate loss reports (referred to as "per-link loss report" in FIG. 2) that include the aggregate packet losses for the links for each network path. Network controller 204 sends to each sender 102($i$) a respective aggregate loss report (indicated generally at 212) populated with the respective list of links traversed by the flow originated at the sender and the aggregate packet losses for the links indicated in the list. Network controller 204 may send the aggregate loss reports periodically to each sender 102($i$).

In one embodiment, network controller 204 sends aggregate loss reports 212 to senders 102 in response to requests for the aggregate loss reports sent by/received from the senders. For example, each sender 102($i$) may send to network controller 204 a respective request including an identifier of the sender (e.g., a sender IP address) and, upon receiving the request, the network controller uses the identifier of the sender as an index to locate the corresponding list of links for the flow originated by the sender in loss statistics database 211, and returns to the sender in the aggregate loss report the list along with the aggregate packet losses associated with the links as maintained in the loss statistics database. In another embodiment, network controller 204 may periodically traverse loss statistics database 211 and automatically send to each sender 102($i$) located in the traversal the respective list mapped to that sender.

With reference to FIG. 3, there is an illustration of an example router report 300 representative of router reports 210(1), 210(2). Router report 300 includes: a message type 302 that indicates that the message is a router (loss) report, a router identifier (ID) 304 (e.g. source IP address) and a network controller ID 306 (e.g., destination IP address); a flow tuple 308 identifying the flow (including a sender ID (e.g., IP address) and a receiver ID (e.g., IP address)), which may be merged with information in fields 302, 304; and an aggregate packet loss 310 including a number of dropped packets and a total number of packets to be forwarded, or a ratio of those quantities, for example.

With reference to FIG. 4, there is an illustration of an example loss statistics database 400 representative of loss statistics database 211 generated by network controller 204 from router reports 300. In the example of FIG. 4, database 400 is a table having rows that each map a respective flow identifier (e.g., F(i)) to the following fields moving left-to-right in the table: a flow tuple including [sender ID, receiver ID] (e.g., ID for sender 102(1), ID for receiver 104(1), which may be IP addresses); a list of links/hops for the flow (e.g., L1, L2, L3); a list of aggregate packet losses (one per link). While only one table is shown in the example of FIG. 4, in another example, the database includes multiple tables, as follows: a first table for the collection of uniquely identifiable flows; a second table for the collection of links/hops and corresponding loss statistics (where each row in the table is identified by a unique link, with different columns recording variants of loss statistics); and a third table specifying which link belongs to which flow.

With reference to FIG. 5, there is an illustration of an example aggregate loss report 500 constructed based on the information in loss statistics database 400. Aggregate loss report 500 includes: a message type 502 that indicates that the message is an aggregate loss report; a network controller ID 504 (e.g. a source IP address); a flow tuple 508 including a sender ID (e.g., source IP address) and a receiver ID (e.g., destination IP address) for the flow identified by the flow tuple; and aggregate packet loss information 510 including a list of link identifiers for the flow and their corresponding, individual per/link aggregate packet losses.

Router report 300 and aggregate loss report 500 may each be represented in a type-length-value (TLV) format.

Figure 6:
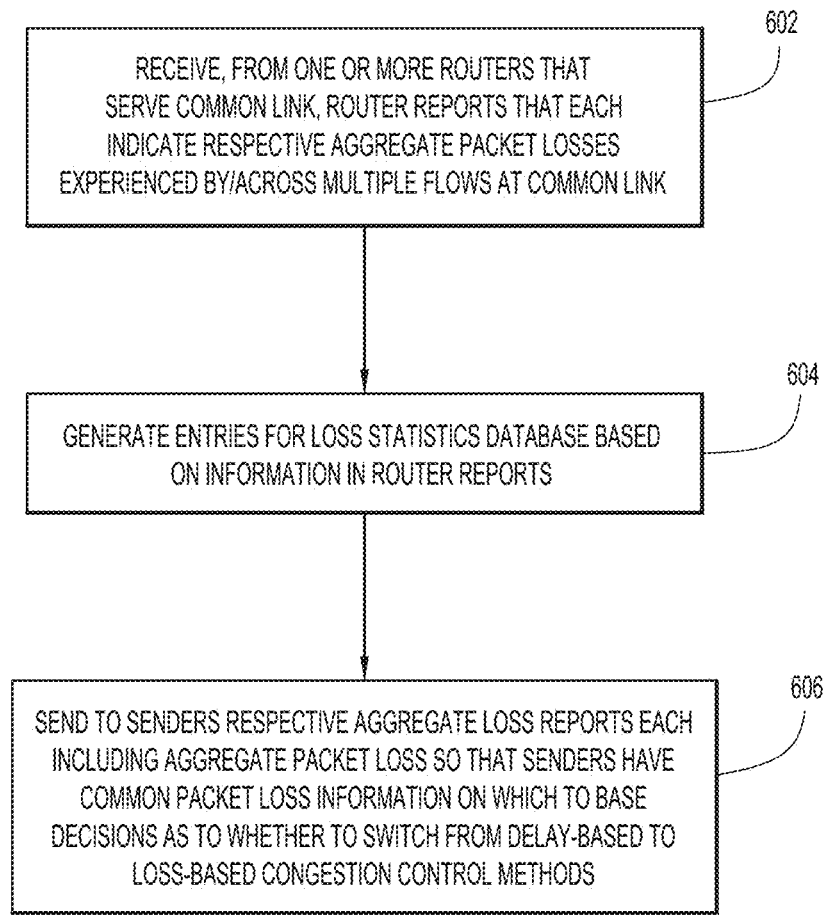
FIG. 6 is a flowchart of a method of collecting, aggregating, and sharing packet losses with the senders of the dual-flow traffic for dual-mode congestion control, performed by the network controller, according to an example embodiment.

With reference to FIG. 6, there is a flowchart of an example method 600 that employs packet loss reports from routers and network controller 204 to collect, aggregate, and share aggregate packet losses across senders 102, performed primarily by network controller 204. In method 600, network controller 204 controls network 106 including routers 108 that forward flows F of packets originated at respective senders 102 to respective receivers 104 along distinct respective network paths each including multiple links, such that the flows merge at common link 206, which imposes a traffic bottleneck on the flows traversing the common link. In practice there may be one or more such traffic bottlenecks in network 106, and method 600 may be applied to each of the traffic bottlenecks. Multiple ones of senders 102, but not necessarily all of the senders, that originate flows sharing common link 206 implement dual-mode congestion control on their respective flows based on packet losses.

At 602, network controller 204 receives, from one or more of routers 108(1), 108(2) that serve common link 206, router reports 210(1), 210(2). Each router report indicates a respective aggregate packet loss experienced by multiple flows F(1), F(2) at/that share common link 206, i.e., the aggregate packet loss represents an aggregate of the packet losses experienced by each flow traversing the common link. More generally, network controller 204 receives from each router for each link of each network path respective router reports that indicate respective aggregate packet losses experienced by the multiple flows that traverse the router at the common link.

At 604, network controller 204 constructs and maintains loss statistics database 211 to map each flow F(i) to the respective sender 102(i) that originated the flow, a list of the links for the flow, and a respective aggregate packet loss for all of the flows at each link.

At 606, network controller 204 sends to senders 102(1), 102(2) respective aggregate loss reports each including the aggregate packet losses received in the router reports at 602 (and stored in loss statistics database 211 at 604), so that the senders have common (aggregate) packet loss information for common link 206 on which to base decisions as to whether to switch from delay-based to loss-based congestion control methods on the flows. In an example in which flow F(1) does not experience any packet losses at common link 206, while flow F(2) experiences packet losses at common link 206, the aggregate packet loss in the aggregate loss report for the common link (as reported in each router report 210(i)) reflects the packet losses experienced by flow F(2), which common link loss information is made available to both senders 102(1), 102(2). More generally, network controller 204 sends to each sender 102(i) the respective aggregate loss report indicating the aggregate packet loss for each link traversed by the flow F(i) originated at the sender. Senders 102 (e.g., senders 102(1), 102(2)) each perform dual-mode congestion control, including determining whether to switch between delay-based and loss-based congestion control modes, based on the common loss information, which may or may not indicate packet losses not experienced by their respective flows.

In summary, in the first embodiment, each router 108 periodically publishes aggregate packet losses for various flows via router reports (i.e., loss reports) to network controller 204, which feeds such information to senders 102 originating dual, real-time media flows traversing the links served by the routers. The router reports and aggregate loss reports from the network controller may be asynchronous; however, system effectiveness and responsiveness may be improved if update intervals for the router reports and the aggregate loss reports are similar, e.g., within the same order of magnitude, to ensure that all sender decisions are coordinated in a timely manner.

Figure 7:
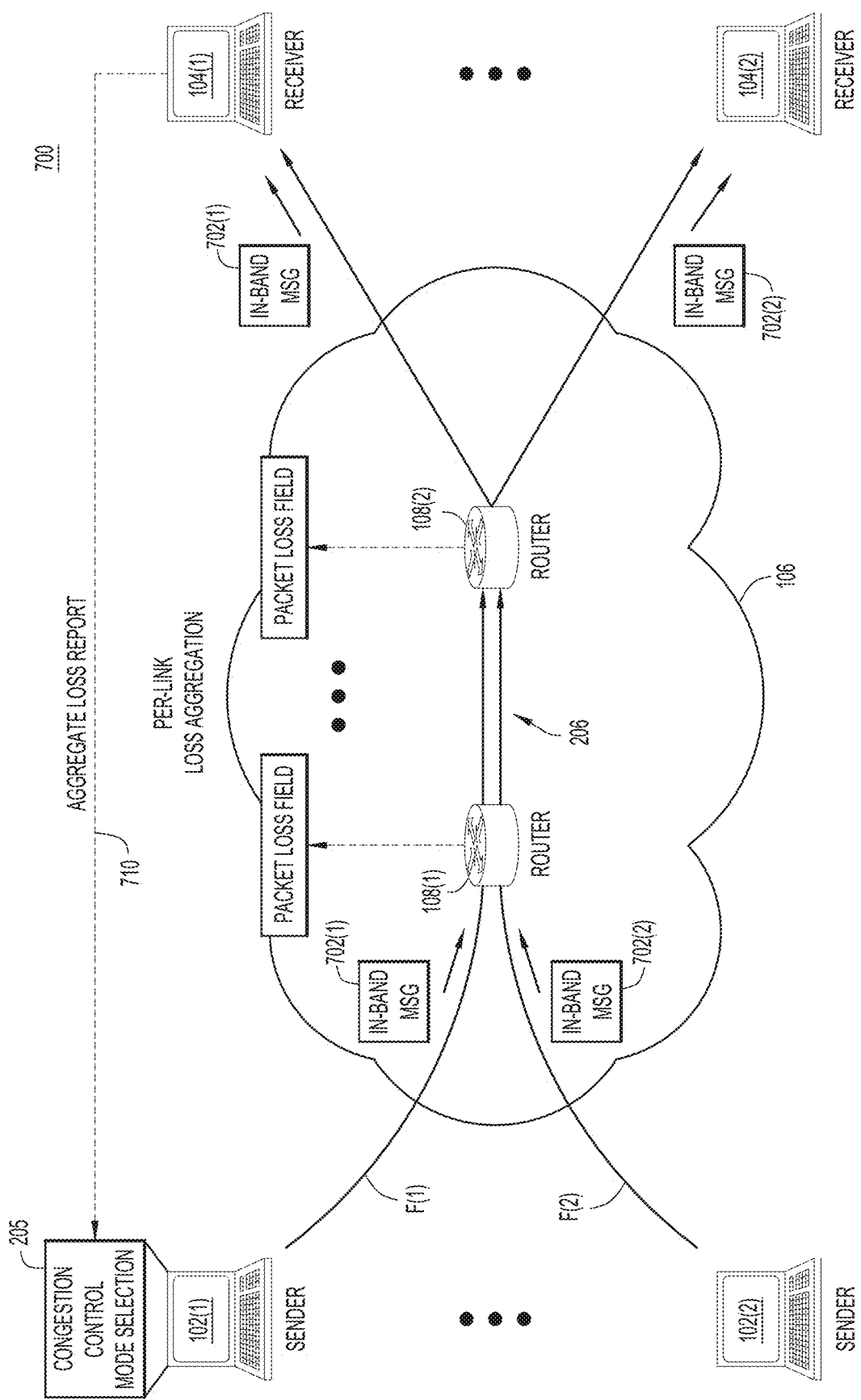
FIG. 7 is an illustration of a dual-flow network bottleneck arrangement in which in-band messages that collect aggregate packet losses are employed to share consistent packet losses across the senders of the dual-flow traffic, according to an embodiment.

With reference to FIG. 7, there is an illustration of an example dual-flow network bottleneck arrangement 700 useful for describing the second embodiment, in which in-band messages that collect aggregate packet losses are employed to share consistent (aggregate) packet losses across senders 102 for dual-mode congestion control. Network bottleneck arrangement 700 is similar to arrangement 200, except that arrangement 700 does not employ network controller 204 to collect, aggregate, and then share packet loss information. Instead, network bottleneck arrangement 700 combines in-band messages and actions by receivers 104 to collect, aggregate, and share the packet loss information. In network bottleneck arrangement 700, each sender 102(i) originates a respective in-band message associated with respective flow F(i) that also originates with the sender, and sends the in-band message to respective receiver 104(i) along with the associated flow. In the example, the in-band message includes a signaling message, not a media packet, and transmission/forwarding of the in-band message may rely on one or more forwarding protocols that are different from the forwarding protocols used to forward the flows.

The in-band message includes an initially cleared or zeroed field to indicate an aggregate packet loss (i.e., an aggregate packet loss field). Routers 108 forward each respective in-band message along the respective network path for the respective flow associated with the in-band message. Accordingly, each in-band message traverses the same routers and links as the flow associated with the in-band message, hence the name "in-band" message.

As a given in-band message traverses the routers along the network path for the associated flow, each router along the network path inserts into the packet loss field (of the given in-band message) the packet losses experienced by each flow (among the one or more flows) also traversing the router, as determined at the router. In an example, the router may simply add the packet losses to whatever value currently occupies the packet loss field in the in-band message. In this way, the routers aggregate in the aggregate packet loss field of the given in-band message the packet losses experienced by each flow at each router along the network path traversed by the in-band message. When the given in-band message finally arrives at the respective receiver, the aggregate packet loss field includes an aggregate packet loss across all of the flows of all of the links along the network path traversed by the flow associated with the in-band message. The respective receiver then sends the aggregate packet loss to the sender that originated the flow associated with the in-band message.

More specifically, in the example of FIG. 7, routers 108(1), 108(2) forward in-band messages 702(1), 702(2) originated at senders 102(1), 102(2) along the network paths for dual-flows F(1), F(2), to receivers 104(1), 104(2). When in-band message 702(i) for flow F(i) traverses routers 108(1), 108(2) in series at common link 206, each router adds to a current value in the aggregate packet loss field (of the in-band message) packet losses experienced by each of flows F(1), F(2) at the router. Each router may also insert into in-band message 702(i) one or more flow tuples to identify one or more flows associated with the packet losses experienced by the flows. Thus, upon exiting router 108(2), the packet loss field of each in-band message 702(i) includes an aggregate packet loss experienced by both flows F(1), F(2) at common link 206 in addition to packet losses experienced by the flows prior to entering the common link. Each in-band message 702(i) is forwarded to respective receiver 104(i).

Each receiver 104(i) receives respective in-band message 702(i) including the aggregate packet loss for both flows F(1), F(2) at the common link 206. Each receiver 104(i) generates and then sends to respective sender 102(i) a respective aggregate loss report (indicated generally at report flow 710) including an aggregate packet loss field populated with the aggregate packet loss from respective in-band message 702(i). For example, receiver 104(i) may copy the aggregate packet loss from the aggregate packet loss field of respective in-band message 702(i) to the aggregate packet loss field of the aggregate loss report, and then send the aggregate loss report. Similar to the first embodiment, this ensures that each sender 102(i) receives a common aggregate packet loss for common link 206. That is, receivers 102(1), 102(2) receive common, aggregate packet losses for common link 206. If one of the flows F(1), F(2) experiences packet losses at common link 206, while the other does not, both senders 102(1), 102(2) will receive their respective aggregate loss reports indicating the same (aggregate) packet losses at the common link, and both senders will perform dual-mode congestion control based on the same packet losses.

Figure 8:
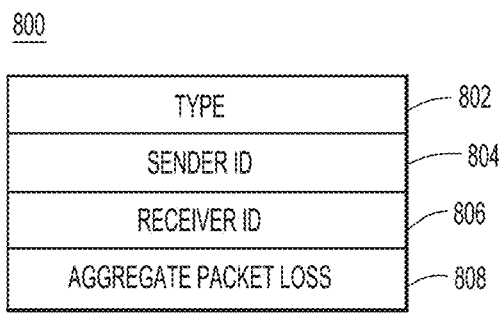
FIG. 8 is an illustration of an in-band message carrying aggregate packet losses, according to an embodiment.

With reference to FIG. 8, there is an illustration of an example in-band message 800 representative of in-band message 702(i). In-band message 800 includes a type field 802 to indicate the message is an in-band message, a sender ID 804 (e.g., source IP address for sender 102(i)), a receiver ID 806 (e.g., destination IP address for receiver 104(i)), and an aggregate packet loss field 808 for an aggregate packet loss.

Figure 9:
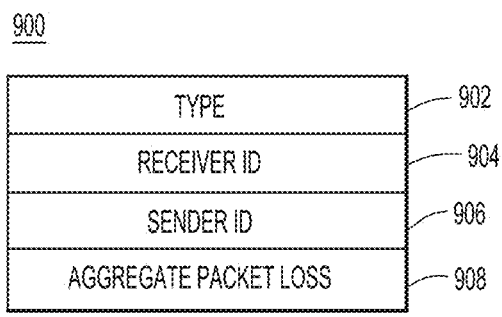
FIG. 9 is an illustration of an aggregate loss report used to report the aggregate packet losses, according to an embodiment.

With reference to FIG. 9, there is an illustration of an example aggregate loss report 900 in report flow 710. Aggregate loss report 900 includes a type field 902 to indicate "aggregate loss report," a receiver ID 904 (e.g., source IP address for receiver 104(i)), a sender ID 906 (e.g., destination IP address for sender 102(i)), and an aggregate packet loss field 908 for an aggregate packet loss for the network path along which the associated flow propagated.

In an example, in-band message 800 and aggregate loss report 900 include a Session Traversal Utilities for NAT (STUN) request expanded to include the aggregate packet loss field and a STUN response expanded to include an aggregate packet loss field populated with the aggregate packet loss as copied from the associated STUN request, respectively, as described above. In this example, sender 102(i) and receiver 104(i) exchange the STUN request and the STUN response in accordance with the STUN protocol. In another example (with non-STUN messages), the messages in FIG. 8 and FIG. 9 may be the same type of message, as the messages may convey the same information.

Figure 10:
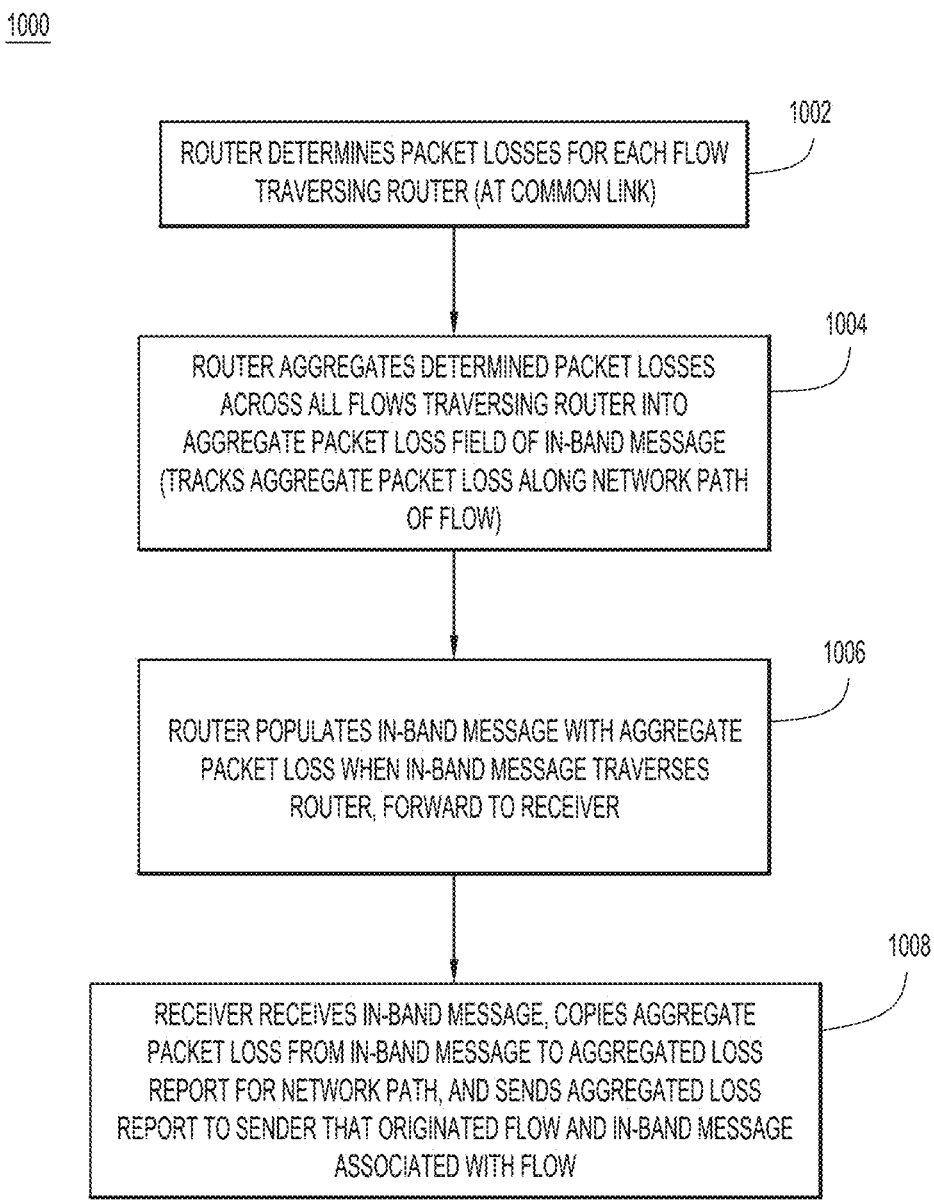
FIG. 10 is a flowchart of a method that combines router-managed in-band messages and actions performed by receivers of the dual-flow traffic to share packet losses to the senders of the dual-flow traffic, according to an embodiment.

With reference to FIG. 10, there is a flowchart of an example method 1000 that combines router-managed in-band messages and actions performed by receivers 104 to share packet losses across senders 102. For method 1000, routers 108 forward multiple flows of packets, and respective in-band messages associated with the flows, originated at respective senders 102 to respective receivers 104 along distinct respective network paths each including multiple links that merge at a common link (e.g., common link 206) served by one or more of the routers.

At 1002, each router 108(i) determines packet losses experienced by each flow traversing the router. For example, the router (e.g., router 102(1) or 102(2)) at common link 206 determines packet losses experienced by each of flows F(1), F(2) at the common link.

At 1004, each router 108(i) aggregates the determined packet losses for each flow into an aggregate packet loss for the flows traversing the router. For example, the router at common link 206 aggregates the determined packet losses for each of flows F(1), F(2) into an aggregate packet loss for both flows at the common link.

At 1006, each router 108(i) populates each in-band message associated with each flow that traverses the router with the determined aggregate packet loss at the router when the in-band message traverses the router. For example, the router at common link 206 populates each in-band message 702(i) with the determined aggregate packet loss for both flows F(1), F(2) at the common link, when the in-band message traverses the common link. To do this, the router may add the determined aggregate packet loss to a current/existing value in the aggregate packet loss field of the in-band message.

Routers 108 forward flows F and their associated in-band messages flow to receiver endpoints 104.

At 1008, each receiver 104(i), upon receiving the respective in-band message, generates a respective aggregate loss report, copies the aggregate packet loss from the in-band message into the respective aggregate loss report, and sends the respective aggregate loss report including the copied aggregate loss report to sender 102(i) that originated the flow associated with the in-band message. This ensures that senders 102 have common (aggregate) packet loss information upon which to base dual-mode congestion control on their respective flows F.

In summary, in the second embodiment, aggregate packet losses/reports are embedded as part of the flow traversing the same path, e.g., in the form of STUN messages. Dual-flows circulate STUN messages capable of conveying the aggregate packet losses/loss reports. In one approach, routers forwarding the STUN messages aggregate the packet losses in the STUN messages. In another approach, upon reception of a STUN message for a dual-flow, the receiver may determine loss events along the path as the union of losses seen on traversed network nodes. In other words, the path of a flow is considered to have encountered a loss if any of the traversed network nodes reports a loss.

In both of the embodiments presented above, each sender 102(i) performs congestion control mode switching based on the common aggregate packet loss information shared to the sender. For both embodiments, the mode switching decision at each sender 102(i) may include, but is not limited to, the following:
 a. If the common loss information (i.e., aggregate packet losses) reported to the sender indicates that a loss is observed along the network path of the flow originated at the sender (whether or not the loss is attributable to the flow originated at the sender):
  i. Set congestion control mode as loss-based;
 b. Else, if no loss is reported in a predetermined past period (e.g., for the past P aggregate loss reports received by the sender):
  i. Set congestion control mode as delay-based;
 c. Else, keep congestion control mode unchanged (i.e., maintain current congestion control mode).

Also, in both embodiments, the routers 108 may perform the same procedure of determining (e.g., measuring and updating) packet losses at the local link. The packet losses, as reported and/or aggregate packet losses, may take the forms presented above, or any of:
 a. A binary indicator of whether any packet losses have occurred in a previous measurement interval;
 b. A floating point number of a packet loss ratio in the previous measurement interval. The packet loss ratio may be equal to a number of lost or dropped packets to a total number of packets to be forwarded in the interval;
 c. A floating point number of the interval from the last seen packet loss; and
 d. A combination of the above (a)-(c).

Similarly, in the first embodiment, network controller 204 may aggregate the reported packet losses such that the aggregate packet loss takes the form of any of (a)-(d) above.

Figure 11:
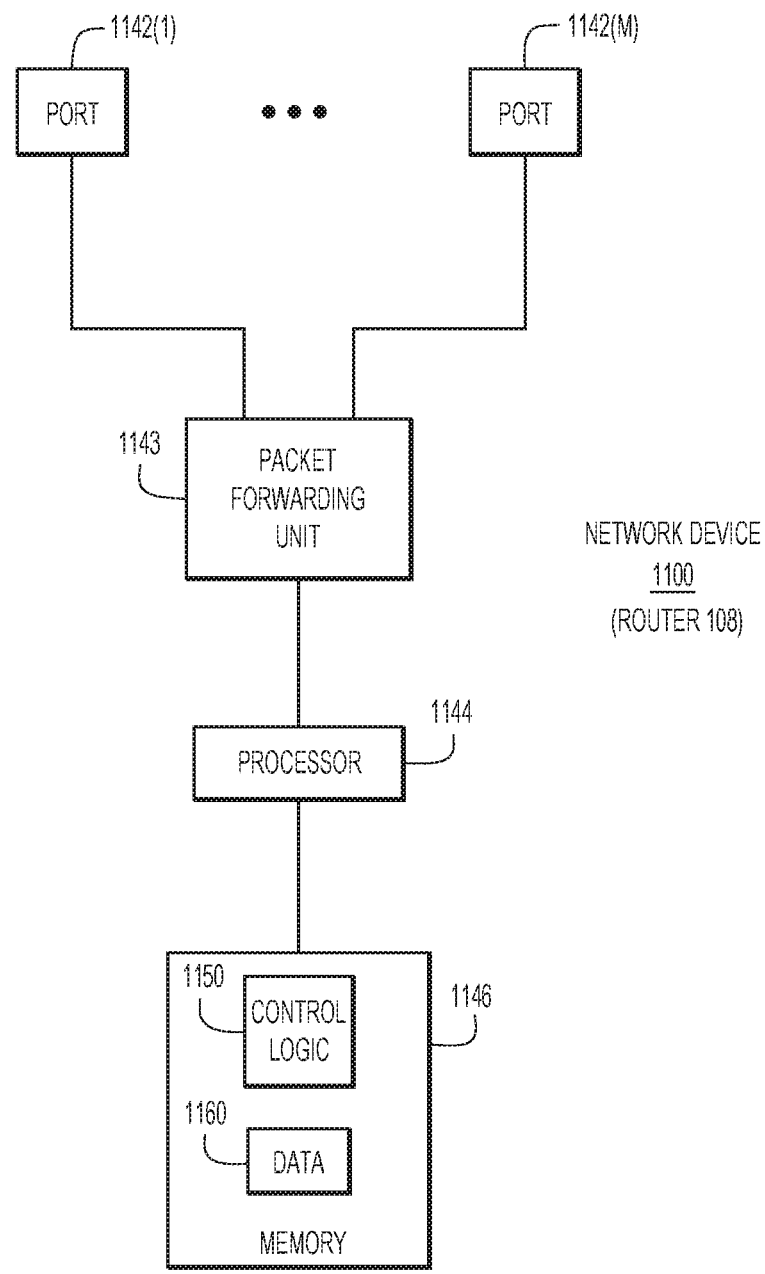
FIG. 11 is a block diagram of a network device representative of a network switch or a router, according to an embodiment.

With reference to FIG. 11, there is a block diagram of an example network device 1100 representative of each of routers 108. Network device 1100 comprises a network interface unit having a plurality of network input/output (I/O) ports 1142(1)-1142(M) to send traffic to and receive traffic from a network, and to forward traffic in the network, a packet forwarding/processing unit 1143, a network processor 1144 (also referred to simply as "processor"), and a memory 1146. The packet forwarding/processing unit 1143 is, for example, one or more application specific integrated circuits (ASICs) that include packet buffers, packet queues, and other control logic for performing packet forwarding operations. The processor 1144 may include multiple processors, which may be implemented as software or hardware processors. For example, processor 1144 may include a microcontroller or microprocessor that is configured to perform higher level controls of network device 1100. To this end, the memory 1146 stores software instructions that, when executed by the processor 1144, cause the processor 1144 to perform a variety of operations including operations described herein. For example, the memory 1146 stores instructions for control logic 1150 to perform operations described herein with respect to sharing packet loss information to assist with dual-mode congestion control, including forwarding flows, determining packet losses for flows, generating and sending router reports, and managing in-band messages. Control logic 1150 may also include logic components in packet forwarding unit 1143.

Memory 1146 also stores data 1160 used and generated by logic 1150, including packet loss information, for example.

Figure 12:
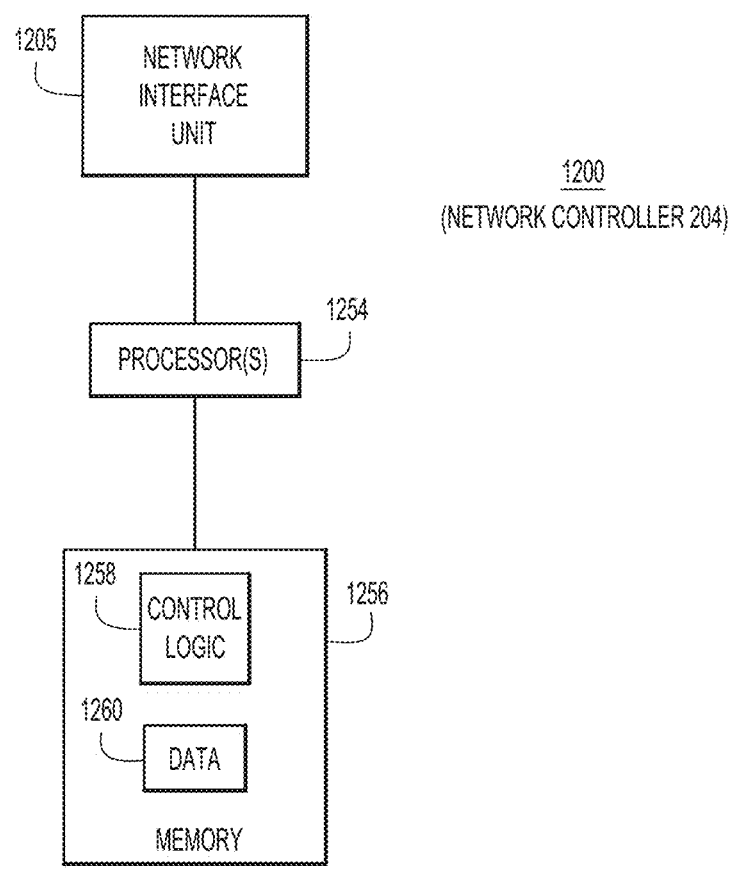
FIG. 12 is a block diagram of a computer device representative of the network controller, according to an embodiment.

With reference to FIG. 12, there is a block diagram of an example computer device 1200 representative of network controller 204. Computer device 1200 includes network interface unit 1205 to communicate with a wired and/or wireless communication network, e.g., network 106, and to control network devices over the network. Computer device 1200 also includes a processor 1254 (or multiple processors, which may be implemented as software or hardware processors), and memory 1256. Network interface unit 1205 may include an Ethernet card with a port (or multiple such devices) to communicate over wired Ethernet links and/or a wireless communication card with a wireless transceiver to communicate over wireless links.

Memory 1256 stores instructions for implementing methods described herein. Memory 1256 may include read only memory (ROM), random access memory (RAM), magnetic disk storage media devices, optical storage media devices, flash memory devices, electrical, optical, or other physical/tangible (non-transitory) memory storage devices. The processor 1254 is, for example, a microprocessor or a microcontroller that executes instructions stored in memory. Thus, in general, the memory 1256 may comprise one or more tangible computer readable storage media (e.g., a memory device) encoded with software comprising computer executable instructions and when the software is executed (by the processor 1254) it is operable to perform the operations described herein. For example, memory 1256 stores control logic 1258 to perform operations for network controller 108 to assist with collecting, aggregating, and sharing packet losses for dual-mode congestion control as described herein.

The memory 1256 may also store data 1260 used and generated by logic 1258.

The operational performance of the embodiments presented above has been tested using a test network topology similar to the bottleneck network arrangements 200 and 700. The network topology and results of experiments on the test network topology are described below in connection with FIG. 13-15.

Figure 13:
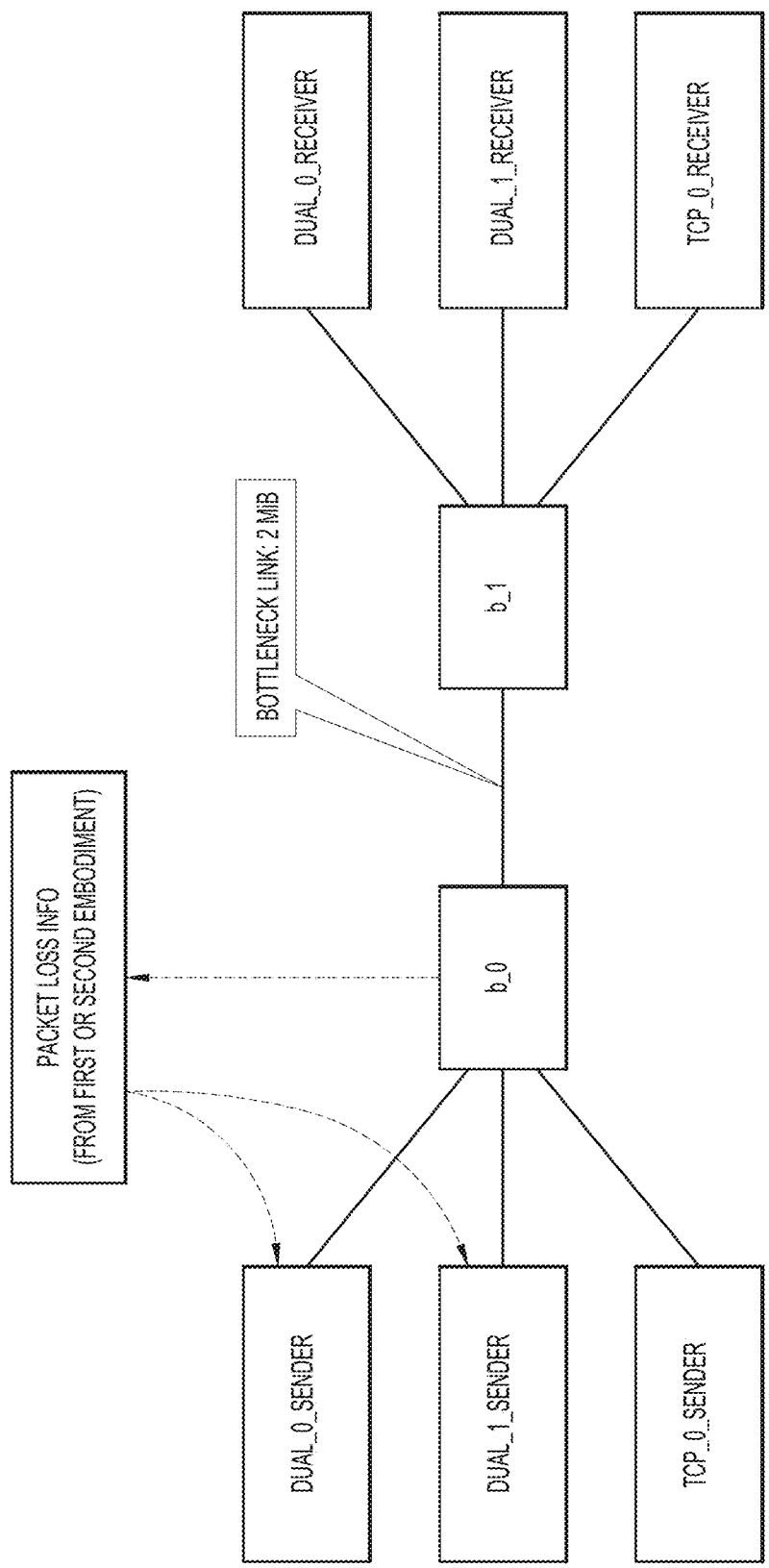
FIG. 13 is an illustration of a test network topology used to test a network bottleneck arrangement using embodiments that share packet loss information with senders.

With reference to FIG. 13, there is an illustration of the test network topology. The topology represents three sender nodes (dual_0_sender, dual_1_sender, and tcp_0_sender), three receiver nodes (dual_0_receiver, dual_1_receiver, and tcp_0_receiver), and two network nodes (b_0 and b_1). A bottleneck link is located between b_0 and b_1, and its capacity is 2 Mbps.

A first experiment performed on the test network topology is a control experiment in which the embodiments presented above are not used. The first experiment uses three flows. Two of the flows are dual flows (dual_0 and dual_1) and one of the flows is a pure loss-based TCP New Reno flow (tcp_0). Their paths from sender to receiver nodes have the same propagation delay: 50 ms. All flows share the bottleneck link between b_0 and b_1. All flows are unidirectional: the media packets flow from left to right, whereas feedback packets (e.g., packet protocol messages) flow from right to left. Therefore, a bottleneck ingress queue is located at node b_0, and has been configured to hold at most 300 ms worth of packets, any further packet will be dropped. The embodiments presented herein capture the dropped packets as packet losses and would otherwise aggregate the packet losses and report the packet losses to the sender; however, the first experiment does not use the packet loss information made available by the embodiments. In other words, the first experiment operates as if the embodiments were not implemented.

Figure 14:
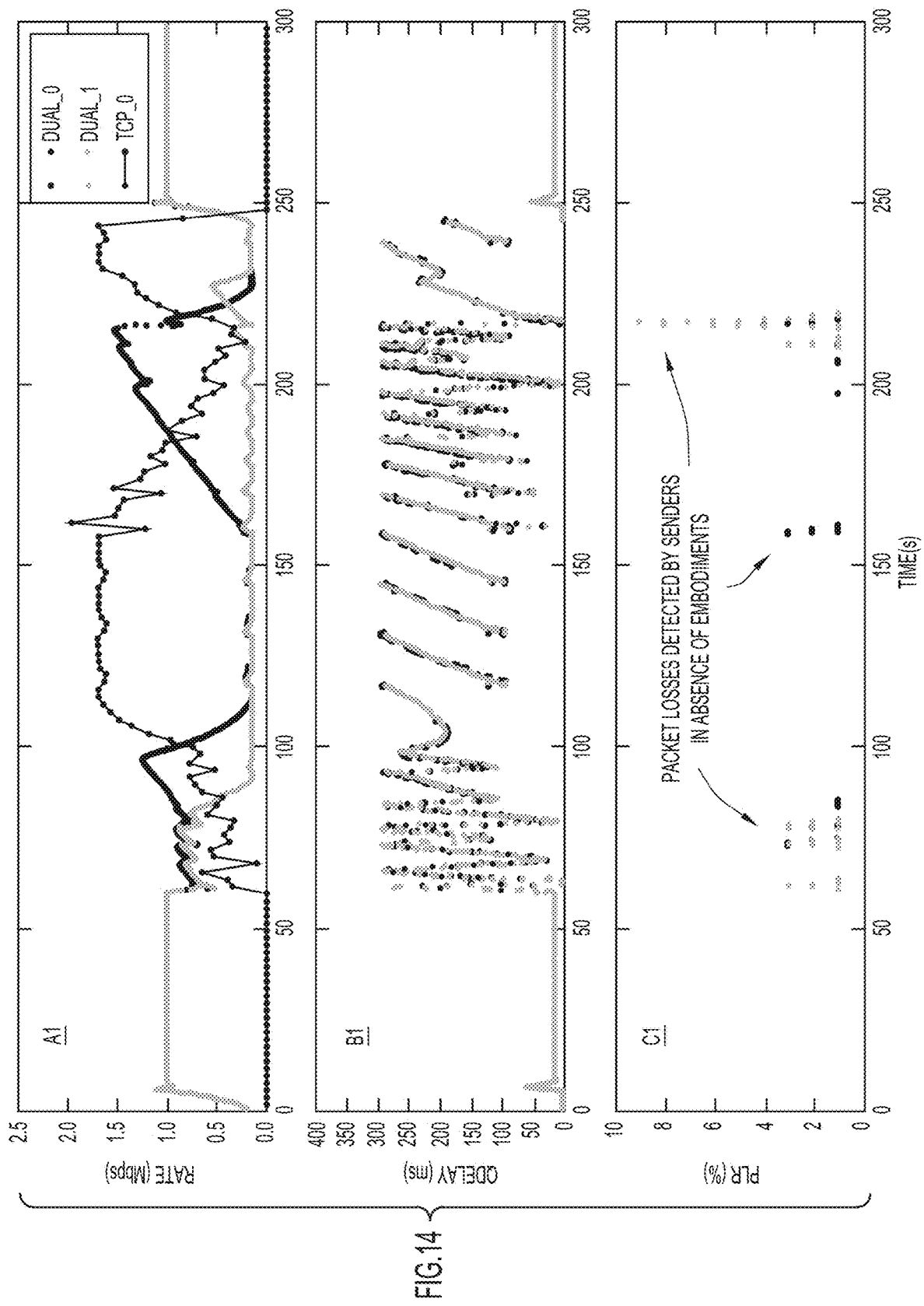
FIG. 14 shows plots of results from a first/control test of the test network topology, in which no network-coordinated packet loss information is available, according to an embodiment.

With reference to FIG. 14, there are shown plots A1, B1, and C1 resulting from the first experiment, for which no packet loss information is available from the test network topology (i.e., aggregate packet losses from the embodiments presented above, represented by "Packet loss info" in the test network topology of FIG. 13, are not used). Thus, the dual-flows rely solely on their own mechanisms to determine packet losses (e.g., detecting gaps in packet sequence numbers). Plot A1 is a plot of packet rate vs. time, plot B1 is a plot of packet queueing delay (QDelay) vs. time, and plot C1 is a plot of packet loss ratio (PLR) vs. time.

The dual flows start at time t=0 seconds (s) and stop at time t=300 s. The TCP flow starts at time t=60 s and stops at time t=240 s. It can be seen from the plots that, as long as there is no ongoing TCP flow, the two dual-flows are in delay-based mode (because the queuing delay, QDelay, is seen to be low) and share the bottleneck link with a high degree of fairness. Between t=60 s and t=90 s, the three flows seem to share the bottleneck link with still some degree of fairness, but from around t=100 s the TCP flow starves the two dual flows. The reason for this is that the dual flows miss nearly all loss events between approximately t=80 s and t=190 s (see PLR on bottom plot C1), therefore they continue to operate in (less-aggressive) delay-based mode.

The only two exceptions are for flow dual_0 at times t=85 s and t=160 s (approximately), where dual_0 does see the loss events. As a result, the rate of flow dual_0 is able to keep up with tcp_0 around those times, thereby compromising fairness with respect to dual_1. Finally, it is noted that the TCP flow continues to experience losses periodically during the whole period: this is evidenced by the QDelay plot B1, which has a saw tooth shape with a packet loss (not plotted) at each peak.

The second experiment performed on the test network topology is almost identical to the first experiment. The only difference is that the embodiments presented above are employed, i.e., the second experiment uses the packet loss information "Packet loss info" in the test network topology of FIG. 13.

Figure 15:
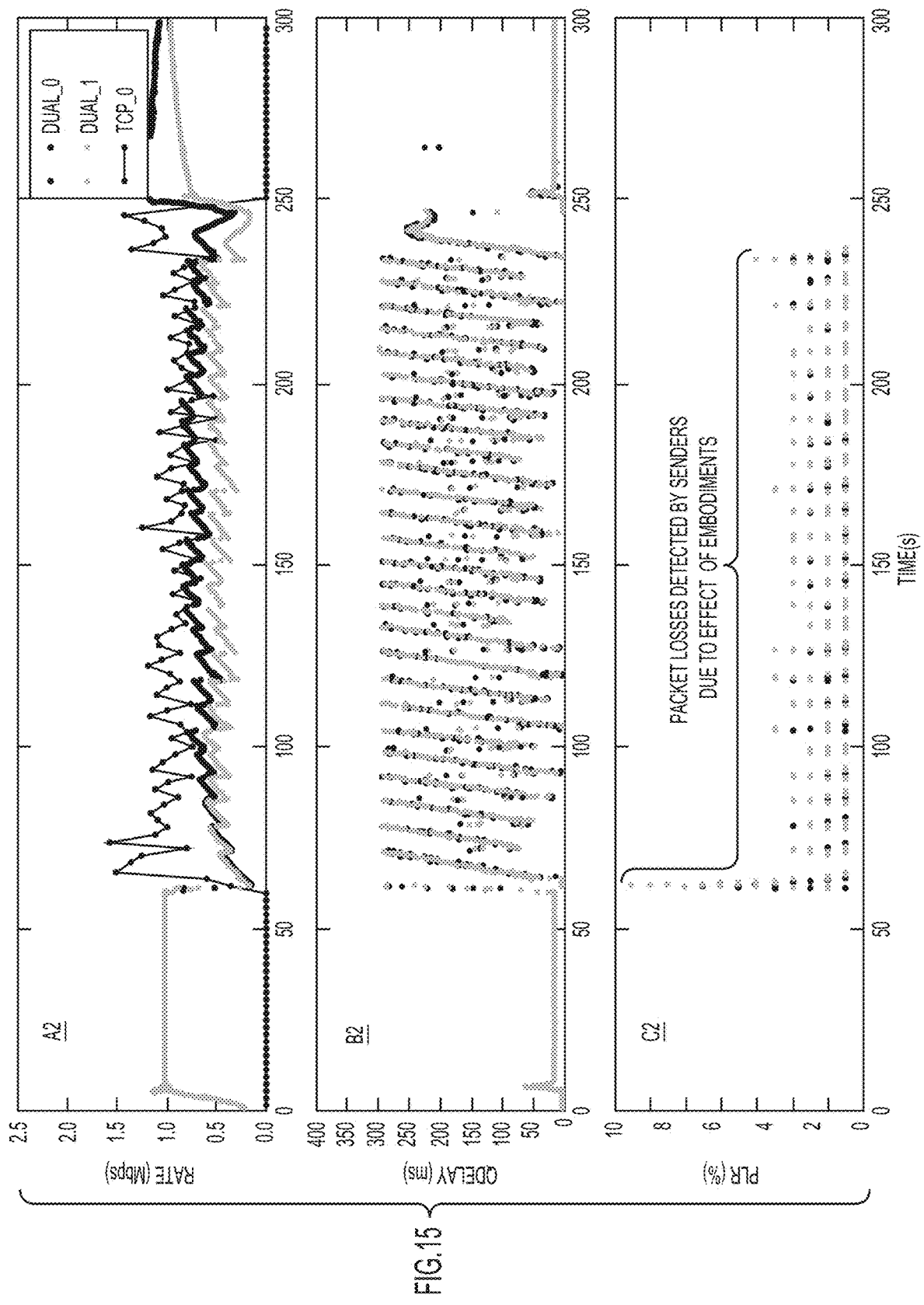
FIG. 15 shows plots of results from a second test of the test network topology, in which network-coordinated packet loss information from the embodiments is available, according to an embodiment.

With reference to FIG. 15, there are shown plots A2, B2, and C2 (which plot the same parameters as plots A1, B1, and C1) resulting from the second experiment, for which packet loss information is available from the test network topology (i.e., the aggregate packet loss information, represented by "Packet loss info" in the test network topology of FIG. 13, is used). In the second experiment, because the packet loss information is used, flows dual_0 and dual_1 do not miss any packet losses, since all packet losses are reported by the network in accordance with the embodiments presented above, even if some packet losses occurred for tcp_0's packets and not for packets sent in the dual-flows. The PLR plot C2 now shows the union of packet losses seen by the dual-flows themselves and those reported by the network.

The fact that dual_0 and dual_1 do not miss packet loss events allows them to switch properly to loss-based mode whenever tcp_0 is present, thereby keeping up with the latter. Additionally, the loss information that the dual flows now receive is consistent, and the plots show the effect in the fairness among them, which has improved dramatically compared to the results of the first experiment.

In summary, in embodiments presented herein, network devices measure local aggregate packet losses (i.e., packet loss events) and share the measurements to all dual-flows traversing the network devices. This enables senders of the dual-flows to choose the congestion control operational mode for their dual flows based on common packet loss measurements at a shared bottleneck, for example, instead of having to infer such decisions individually. First and second embodiments are presented. In both embodiments, packet losses of flows are measured and monitored at each network node, and shared to senders of the flows (either via a central controller in the first embodiment or via in-path messages in the second embodiment). Through the shared information, each sender receives packet loss information for other participants (flows) on a shared link that the sender, if using conventional techniques, would otherwise not see because it would only be monitoring its own flow. The senders determine whether to switch mode between delay-based and loss-based congestion control based on the shared information. Thus, the embodiments coordinate the mode selection behavior of latency-sensitive flows operating with dual modes of congestion control (i.e., loss-based and delay-based mode). This is achieved by sharing the same in-network measurement information such as loss reports across competing senders in a timely manner.

In summary, in one aspect, a method is provided comprising: at a controller of a network including routers to forward flows of packets originated at respective sender endpoints to respective receiver endpoints along distinct respective network paths each including multiple links, such that the flows merge at a common link served by one or more of the routers and that imposes a traffic bottleneck on the flows traversing the common link: receiving router reports from the one or more of the routers, each router report indicating an aggregate packet loss that represents an aggregate of respective packet losses experienced by each of the flows at the common link as measured by the router that originated the router report; and sending to the sender endpoints respective aggregate loss reports each including the aggregate packet loss so that the sender endpoints have common packet loss information for the common link on which to base decisions as to whether to switch from delay-based to loss-based congestion control modes when implementing dual-mode congestion control of the flows.

In another aspect, an apparatus is provided comprising: a network interface unit to communicate with a network including routers to forward flows of packets originated at respective sender endpoints to respective receiver endpoints along distinct respective network paths each including multiple links, such that the flows merge at a common link served by one or more of the routers and that imposes a traffic bottleneck on the flows traversing the common link; and a processor coupled to the network interface and configured to perform: receiving router reports from the one or more of the routers, each router report indicating an aggregate packet loss that represents an aggregate of respective packet losses experienced by each of the flows at the common link as measured by the router that originated the router report; and sending to the sender endpoints respective aggregate loss reports each including the aggregate packet loss so that the sender endpoints have common packet loss information for the common link on which to base decisions as to whether to switch from delay-based to loss-based congestion control modes when implementing dual-mode congestion control of the flows.

In yet another aspect, a non-transitory computer readable medium that stores instructions is provided. The instructions, when executed by a processor of a controller of a network including routers to forward flows of packets originated at respective sender endpoints to respective receiver endpoints along distinct respective network paths each including multiple links, such that the flows merge at a common link served by one or more of the routers and that imposes a traffic bottleneck on the flows traversing the common link, cause the processor/controller to perform: receiving router reports from the one or more of the routers, each router report indicating an aggregate packet loss that represents an aggregate of respective packet losses experienced by each of the flows at the common link as measured by the router that originated the router report; and sending to the sender endpoints respective aggregate loss reports each including the aggregate packet loss so that the sender endpoints have common packet loss information for the common link on which to base decisions as to whether to switch from delay-based to loss-based congestion control modes when implementing dual-mode congestion control of the flows.

In a further aspect, a method is provided comprising: at a router in a network of routers to forward flows of packets, and to forward a respective in-band message associated with each flow, originated at respective sender endpoints to respective receiver endpoints along distinct respective network paths each including multiple links, such that the flows merge at a common link served by the router: determining packet losses experienced by each flow traversing the common link; aggregating the determined packet losses for each flow into an aggregate packet loss for the flows at the common link; and populating each in-band message with the aggregate packet loss when the in-band message traverses the common link; and at each receiver endpoint, upon receiving the respective in-band message, forwarding, in a respective aggregate loss report, the aggregate packet loss from the in-band message to the sender endpoint that originated the flow associated with the in-band message, so that the sender endpoints have common packet loss information for the common link on which to base decisions as to whether to switch from delay-based to loss-based congestion control modes when implementing dual-mode congestion control of the flows.

In yet a further aspect, a system is provided comprising: receiver endpoints; and a router in a network of routers to forward flows of packets, and to forward a respective in-band message associated with each flow, originated at respective sender endpoints to respective receiver endpoints among the receiver endpoints along distinct respective network paths each including multiple links, such that the flows merge at a common link served by the router, wherein the router is configured to perform: determining packet losses experienced by each flow traversing the common link; aggregating the determined packet losses for each flow into an aggregate packet loss for the flows at the common link; and populating each in-band message with the aggregate packet loss when the in-band message traverses the common link; and each receiver endpoint is configure to perform, upon receiving the respective in-band message, forwarding, in a respective aggregate loss report, the aggregate packet loss from the in-band message to the sender endpoint that originated the flow associated with the in-band message, so that the sender endpoints have common packet loss information for the common link on which to base decisions as to whether to switch from delay-based to loss-based congestion control modes when implementing dual-mode congestion control of the flows.

In yet another aspect, one or more non-transitory computer readable media that store instructions are provided. The instructions, when executed by a processor of a router in a network of routers to forward flows of packets, and to forward a respective in-band message associated with each flow, originated at respective sender endpoints to respective receiver endpoints along distinct respective network paths each including multiple links, such that the flows merge at a common link served by the router, cause the processor/router to perform: determining packet losses experienced by each flow traversing the common link; aggregating the determined packet losses for each flow into an aggregate packet loss for the flows at the common link; and populating each in-band message with the aggregate packet loss when the in-band message traverses the common link. The instructions, when executed by each processor of a respective receiver endpoint, cause the processor/receiver endpoint to perform upon receiving the respective in-band message, forwarding, in a respective aggregate loss report, the aggregate packet loss from the in-band message to the sender endpoint that originated the flow associated with the in-band message, so that the sender endpoints have common packet loss information for the common link on which to base decisions as to whether to switch from delay-based to loss-based congestion control modes when implementing dual-mode congestion control of the flows.

The above description is intended by way of example only.

What is claimed is:

1. A method comprising:
   at a controller of a network including routers to forward flows of packets originated at respective sender endpoints to respective receiver endpoints along distinct respective network paths each including multiple links, such that the flows merge at a common link served by one or more of the routers and that imposes a traffic bottleneck on the flows traversing the common link:
   receiving router reports from the one or more of the routers, each router report indicating an aggregate packet loss that represents an aggregate of respective packet losses experienced by each of the flows at the common link as measured by the router that originated the router report; and
   sending to the respective sender endpoints respective aggregate loss reports each including the aggregate packet loss so that the sender endpoints have common packet loss information for the common link on which to base decisions as to whether to switch from delay-based to loss-based congestion control modes when implementing dual-mode congestion control of the flows.

2. The method of claim 1, wherein:
   the receiving includes receiving the router reports to indicate that a first flow among the flows did not experience any packet losses at the common link, while a second flow among the flows experienced packet losses at the common link; and
   the sending includes sending to a first one of the sender endpoints that originated the first flow and to a second one of the endpoints that originated the second flow the respective aggregate reports including the aggregate packet loss that indicates the packet losses experienced by the second flow.

3. The method of claim 1, wherein:
the receiving includes receiving from each router for each link of each network path respective router reports that indicate a respective aggregate packet loss that represents an aggregate of packet losses experienced by each flow at the link; and
the sending includes sending to each sender endpoint a respective aggregate loss report indicating a respective aggregate packet loss for each link traversed by the flow originated at the sender endpoint.

4. The method of claim 3, further comprising, at the controller:
generating a database that maps each flow to the respective sender endpoint that originated the flow, a list of the multiple links for the flow, and the respective aggregate packet loss for each of the multiple links for the flow.

5. The method of claim 1, wherein:
the receiving includes receiving each router report to include a flow tuple that identifies the flows traversing the common link and an identifier of the common link.

6. The method of claim 1, further comprising, at the controller:
receiving from each sender endpoint a respective request for packet loss information for the flow that originated at the sender endpoint; and
responsive to receiving each request, sending to the sender endpoint that sent the request the respective aggregate loss report.

7. The method of claim 1, wherein:
the receiving includes receiving each router report to include as the aggregate packet loss a ratio of a number of packets dropped at the router in a given time period to a total number of packets to be forwarded in the given time period.

8. An apparatus comprising:
a network interface unit to communicate with a network including routers to forward flows of packets originated at respective sender endpoints to respective receiver endpoints along distinct respective network paths each including multiple links, such that the flows merge at a common link served by one or more of the routers and that imposes a traffic bottleneck on the flows traversing the common link; and
a processor coupled to the network interface unit and configured to perform:
receiving router reports from the one or more of the routers, each router report indicating an aggregate packet loss that represents an aggregate of respective packet losses experienced by each of the flows at the common link as measured by the router that originated the router report; and
sending to the respective sender endpoints respective aggregate loss reports each including the aggregate packet loss so that the sender endpoints have common packet loss information for the common link on which to base decisions as to whether to switch from delay-based to loss-based congestion control modes when implementing dual-mode congestion control of the flows.

9. The apparatus of claim 8, wherein:
the receiving includes receiving the router reports to indicate that a first flow among the flows did not experience any packet losses at the common link, while a second flow among the flows experienced packet losses at the common link; and
the sending includes sending to a first one of the sender endpoints that originated the first flow and to a second one of the endpoints that originated the second flow the respective aggregate reports including the aggregate packet loss that indicates the packet losses experienced by the second flow.

10. The apparatus of claim 8, wherein:
the receiving includes receiving from each router for each link of each network path respective router reports that indicate a respective aggregate packet loss that represents an aggregate of packet losses experienced by each flow at the link; and
the sending includes sending to each sender endpoint a respective aggregate loss report indicating a respective aggregate packet loss for each link traversed by the flow originated at the sender endpoint.

11. The apparatus of claim 10, wherein the processor is further configured to perform:
generating a database that maps each flow to the respective sender endpoint that originated the flow, a list of the multiple links for the flow, and the respective aggregate packet loss for each of the multiple links for the flow.

12. The apparatus of claim 8, wherein:
the receiving includes receiving each router report to include a flow tuple that identifies the flows traversing the common link and an identifier of the common link.

13. The apparatus of claim 8, wherein the processor is further configured to perform:
receiving from each sender endpoint a respective request for packet loss information for the flow that originated at the sender endpoint; and
responsive to receiving each request, sending to the sender endpoint that sent the request the respective aggregate loss report.

14. A non-transitory computer readable medium encoded with instructions that, when executed by a processor of a controller of a network including routers to forward flows of packets originated at respective sender endpoints to respective receiver endpoints along distinct respective network paths each including multiple links, such that the flows merge at a common link served by one or more of the routers and that imposes a traffic bottleneck on the flows traversing the common link, cause the processor to perform:
receiving router reports from the one or more of the routers, each router report indicating an aggregate packet loss that represents an aggregate of respective packet losses experienced by each of the flows at the common link as measured by the router that originated the router report; and
sending to the respective sender endpoints respective aggregate loss reports each including the aggregate packet loss so that the sender endpoints have common packet loss information for the common link on which to base decisions as to whether to switch from delay-based to loss-based congestion control modes when implementing dual-mode congestion control of the flows.

15. The non-transitory computer readable medium of claim 14, wherein:
  the instructions to cause the processor to perform the receiving include instructions to cause the processor to perform receiving the router reports to indicate that a first flow among the flows did not experience any packet losses at the common link, while a second flow among the flows experienced packet losses at the common link; and
  the instructions to cause the processor to perform the sending include instructions to cause the processor to perform sending to a first one of the sender endpoints that originated the first flow and to a second one of the endpoints that originated the second flow the respective aggregate reports including the aggregate packet loss that indicates the packet losses experienced by the second flow.

16. The non-transitory computer readable medium of claim 14, wherein:
  the instructions to cause the processor to perform the receiving include instructions to cause the processor to perform receiving from each router for each link of each network path respective router reports that indicate a respective aggregate packet loss that represents an aggregate of packet losses experienced by each flow at the link; and
  the instructions to cause the processor to perform the sending include instructions to cause the processor to perform sending to each sender endpoint a respective aggregate loss report indicating a respective aggregate packet loss for each link traversed by the flow originated at the sender endpoint.

17. The non-transitory computer readable medium of claim 16, further comprising instructions to cause the processor to perform:
  generating a database that maps each flow to the respective sender endpoint that originated the flow, a list of the multiple links for the flow, and the respective aggregate packet loss for each of the multiple links for the flow.

18. The non-transitory computer readable medium of claim 14, wherein:
  the instructions to cause the processor to perform the receiving include instructions to cause the processor to perform receiving each router report to include a flow tuple that identifies the flows traversing the common link and an identifier of the common link.

19. The non-transitory computer readable medium of claim 14, further comprising instructions to cause the processor to perform:
  receiving from each sender endpoint a respective request for packet loss information for the flow that originated at the sender endpoint; and
  responsive to receiving each request, sending to the sender endpoint that sent the request the respective aggregate loss report.

20. The non-transitory computer readable medium of claim 14, wherein:
  the instructions to cause the processor to perform the receiving include instructions to cause the processor to perform receiving each router report to include as the aggregate packet loss a ratio of a number of packets dropped at the router in a given time period to a total number of packets to be forwarded in the given time period.

* * * * *